3,228,998
LIQUID POLYPHOSPHATE ESTERS
William L. Fierce, Crystal Lake, and Walter J. Sandner, Carpentersville, Ill., assignors, by mesne assignments, to Union Oil Company of California, Los Angeles, Calif., a corporation of California
No Drawing. Filed Oct. 17, 1960, Ser. No. 62,841
5 Claims. (Cl. 260—928)

This application is a continuation-in-part of our co-pending application, Serial No. 729,231, filed April 18, 1958.

This invention relates to new and useful improvements in methods for preparation of polyphosphate esters and to the novel products of said process. More particularly, this invention is directed to a novel process whereby an alkyl or aryl phosphoryl dihalide (ROPOX$_2$) is reacted with a dihydroxy organic compound in an inert mutual solvent for the reactants to produce polyphosphate esters which vary in composition according to the proportion of reactants used.

Organophosphorus compounds have been extensively investigated (see "Organophosphorus Compounds," Kosolapoff, John Wiley and Sons, Inc., 1950) in recent years for a variety of purposes. Many organophosphorus compounds have found use as insecticides and plasticizers and more recently as synthetic lubricants. Phosphorus-containing esters in particular have proved useful in many cases as high-temperature lubricants and as hydraulic fluids in applications where petroleum lubricating oils could not be used. Phosphate esters as synthetic lubricants for high-temperature use have been found to be superior to petroleum oils in lubricating characteristics and are much less flammable and less volatile than petroleum lubricating oils. On the other hand, phosphate esters have been limited in use because of poor viscosity-temperature characteristics.

It is therefore one object of this invention to provide an improved method for preparation of organophosphorus compounds of varying molecular weight.

Another object of this invention is to provide an improved method of preparing polyphosphate esters which are novel in composition and have superior properties as synthetic lubricants.

Another object of this invention is to provide a novel class of organophosphorus compounds which are particularly useful as functional fluids, e.g., hydraulic fluids, brake fluids, and synthetic lubricants.

A feature of this invention is the provision of a process for preparation of liquid polyphosphate esters in which an organophosphoryl dihalide (ROPOX$_2$) is reacted with a dihydroxy organic compound to produce compounds varying from monomeric esters to relatively high polymers.

Another feature of this invention is the provision of a novel class of polyphosphate esters of dihydroxy organic compounds which have a large liquidus range and high viscosity index.

Another feature of this invention is the provision of an improved class of polyphosphate esters which are produced by reaction of an alkyl or ayl phosphoryl dihalide with a glycol or a dihydroxy aromatic hydrocarbon, some of which esters are liquid over a wide temperature range and have high viscosity indexes.

Another feature of this invention is the provision of a novel class of organophosphorus-containing synthetic lubricants or hydraulic fluids.

Still another feature of this invention is the provision of a process for preparation of novel polyphosphate esters by addition of a phosphoryl dihalide to a solution of a dihydroxy organic compound, said esters ranging in properties from liquids, useful as lubricants or hydraulic fluids, to solid polymers, useful as coatings.

Other objects and features of this invention will become apparent from time to time throughout the specification and claims as hereinafter related.

This invention is based on a discovery that organophosphoryl dihalides will react with dihydroxy organic compounds in varying proportions, in solution in a mutual solvent for the reactants which is inert toward the reactants, at a temperature of about —20° to +20° C., to produce organic polyphosphate esters which represent a novel class of compounds which is useful for synthetic lubricants, hydraulic fluids, coatings, and the like.

When a phosphoryl dihalide of the formula ROP(O)X$_2$, where R is any organic radical which is inert under the reaction conditions, and X is a halogen such as chlorine, bromine, or iodine, is added to a dihydroxy organic compound of the formula HOR'OH, where R' is a divalent organic nucleus which is inert under reaction conditions, in solution in a mutual solvent for the reactants which is inert toward the reactants, at a temperature of about —20° to +20° C., there are formed polyphosphate esters of a type previously unreported in the literature. When reactants are used which do not result in a rapid reaction, a basic HX acceptor may be used to shift the equilibrium of the reaction. These HX acceptors include nitrogenous bases (e.g., pyridine, triethylamine, etc.) and anion exchange resins. The product esters (usually liquids) range in composition from simple monomeric phosphates to polymers in which phosphorus-containing functional groups are linked by the dihydroxy organic compounds. The general formula of these novel esters is

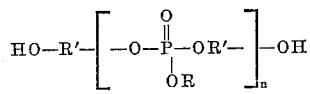

where R and R' are as defined above, and $n$ is an integer.

In carrying out this process, any alkyl or aryl phosphoryl dihalide (also known as alkyl or aryl dihalophosphates) may be used. These phosphoryl dihalides are prepared by reaction of the corresponding phosphorus oxyhalide (e.g., phosphorus oxychloride, phosphorus oxybromide, or phosphorus oxyiodide) with an alcohol (C$_1$–C$_{20}$, or higher), a phenol (including polycyclic phenols), or monohydric alcohols containing ether linkages, known as Cellosolves and carbitols. Phosphoryl dihalides which are useful in this invention are illustrated by, but not necessarily limited to, the following: methyl phosphoryl dichloride, methyl phosphoryl dibromide, ethyl phosphoryl dichloride, ethyl phosphoryl dibromide, amyl phosphoryl dichloride, amyl phosphoryl diiodide, 2-ethylhexyl phosphoryl dichloride, 2-ethylhexyl phosphoryl dibromide, 2-ethylhexyl phosphoryl diiodide, dodecyl phosphoryl dichloride, octadecyl phosphoryl dichloride, octadecyl phosphoryl dibromide, phenyl phosphroyl dichloride, phenyl phosphoryl dibromide, phenyl phosphoryl diiodide, tolyl phosphoryl dichloride, tolyl phosphoryl dibromide, octadecylphenyl phosphoryl dichloride, naphthyl phosphoryl dichloride, anthracyl phosphoryl dibromide, methoxyethyl phosphoryl dichloride, ethoxyethyl phosphoryl dichloride, ethoxyethoxyethyl phosphoryl dichloride, and methoxyethoxyethoxyethyl phosphoryl dichloride. The dihydroxy organic compounds which may be used in this process include any dihydroxy organic compounds in which the nuclear portion of the compound is inert under the reaction conditions and the hydroxy radicals contain the only active hydrogen in the molecule. Thus, compounds which are useful in this process include glycols, polyglycols, dihydroxy-substituted aromatic hydrocarbons, and derivatives containing only inert substituents, e.g., halogen, alkoxy, aryloxy, carboalkoxy, carboaryloxy, etc. Dihydroxy compounds which are useful in this process are illustrated by, but not limited to, the following:

$HOC_2H_4OH, H(OC_2H_4)_2OH$
$H(OC_2H_4)_3OH, H(OC_2H_4)_4OH$ mixtures of the formula $H(OC_2H_4)_nOH$, where $n$ is an integer and ranging in molecular weight from 100 to 4000 and higher, $HOCH(CH_3)CH_2OH, H(OCH(CH_3)CH_2)_mOH$ where $m$ is an integer from 2 to 50 or higher, mixed polyglycols of molecular weights up to 4000 or higher produced by reaction of ethylene oxide or propylene oxide with propanol or butanol, $HO(CH_2)_3OH, HO(CH_2)_4OH, HO(CH_2)_5OH, HOC_6H_4—C_6H_4OH, C_6H_4(OH)_2$ (all isomers), $HOC_6H_4CH_2OH$ (all isomers), dihydroxynaphthalene, dihydroxyanthracene, and derivatives of compounds of all of the classes illustrated which contain only inert substituents, such as halogen, ether, or ester substituents, e.g., $HOCH_2CHBrOH, HOCH(CH_2Cl)CH_2OH$
$HOCH_2CH(OCH_3)CH_2OH$
$HOCH_2CH(O\overset{O}{\overset{\|}{C}}CH_3)CH_2OH$ $HO(CH_2CHClO)_nH$, where $n$ is an integer of 1 to 50, $HO(CH_2CH(O\overset{O}{\overset{\|}{C}}CH_3)CH_2O)_nH$ where $n$ is an interger of 1 to 50, $HO(CH_2CH(OC_4H_9)CH_2O)_nH$ where $n$ is an integer of 1 to 50, $CH_3OC_6H_3(OH)_2, BrC_6H_3(OH)_2$
$HOCH_2CH(OC_6H_5)CH_2OH$
$HOCH_2CH(OC_6H_4Cl)C_2OH$ and $HOCH_2CH(O\overset{O}{\overset{\|}{C}}C_6H_5)CH_2OH$ Solvents which may be used in this reaction include any inert solvent for the reactants which is unreactive with either of the reactants under the conditions of reaction. Solvents used are highly polar solvents which are unreactive toward the phosphoryl dihalide. The particular solvent which is used is selected for maximum solubility of the particular reactants. Solvents which may be used in this process include, but are not necessarily limited to, the following: methyl ether, ethyl ether, dimethyl formamide, dimethyl acetamide, ethyleneglycol dimethyl ether, diethyleneglycol dimethyl ether, triethyleneglycol dimethyl ether, and tetraethyleneglycol dimethyl ether.

The following specific examples are illustrative of this invention.

*Example I*

A one-liter, three-necked flask equipped with stirrer, thermometer, dropping funnel and ice-water bath, was charged with 51.1 g. (⅓ mol) of phosphorus oxychloride ($POCl_3$). Then 43.4 g. (⅓ mol) of 2-ethyl-1-hexanol was added dropwise, with stirring, while the temperature was maintained at about 10° C. by means of the ice-water bath. This additional took about one hour, and the mixture was stirred for an additional hour at room temperature. The product, 2-ethylhexyl phosphoryl dichloride, was then freed of HCl gas by bubbling nitrogen gas therethrough for one hour at room temperature while maintaining a reduced pressure of about 20 mm. Hg by means of a water aspirator. The 2-ethylhexyl phosphoryl dichloride thus produced was then added slowly, with stirring, to a mixture of 100.3 g. (⅔ mol) of triethylene glycol, 250 ml. of anhydrous ethyl ether, and 56 ml. of pyridine. During this addition which took about 1½ hours, the temperature was held at about 15° C. by means of an ice bath. The mixture was then stirred for an additional hour at room temperature. The solid by-product pyridine hydrochloride was removed from the product ester by filtration. The product which remained was washed with dilute aqueous HCl to remove excess pyridine and then washed with water. All volatile material was removed by stripping with nitrogen under reduced pressure (about 20 mm. Hg) to yield 63.0 g. of a colorless, very viscous liquid. The product which was obtained was analyzed and found to contain 8.7 wt. percent phosphorus, and had a molecular weight of 1280, determined cryoscopically using benzene as the solvent. This product, based upon the most probable reaction mechanism, is most certainly a mixture of phosphate ester polymers of triethylene glycol having an average general formula, $$HOC_2H_4OC_2H_4OC_2H_4-\left[\begin{matrix} O-\overset{O}{\overset{\|}{P}}-OC_2H_4OC_2H_4OC_2H_4 \\ O-CH_2-CH(C_2H_5)-CH_2-CH_2-CH_2-CH_3 \end{matrix}\right]_n-OH$$

where $n$ is an integer of about 1 to 10. This liquid product was tested and found to have good lubricating properties and can be substituted for petroleum lubricating oils, especially for use at elevated temperatures. This mixture of liquid esters had a viscosity, SUS at 100° F., of 1412; SUS at 130° F., of 644; SUS at 210° F., of 159; and a V.I. (viscosity index) of 128. This liquid product had a pour point of −30° F. The combination of good lubricating properties, low pour point, and high viscosity and high viscosity index make this liquid ester (or mixture of esters) a very desirable synthetic lubricant for high-temperature applications. This product is also useful as a brake fluid or hydraulic fluid.

*Example II*

In another experiment the procedure of Example I was repeated except that the 2-ethylhexyl phosphoryl dichloride was added to the triethylene glycol-ether solution in a mol ratio of 0.125 instead of the mol ratio of 0.5 used in Example I. The reaction reached completion in the same period of time and by-products of reaction were removed using the same procedure as in Example I. The product which was obtained was a viscous liquid (much less viscous than the product of Example I) containing 3.42 wt. percent phosphorus. This liquid product had a molecular weight of about 500. The liquid product had a pour point less than −75° F. and a V.I. of 99. The viscosity of this product was measured and found to be 158.9 SUS at 100° F., 88.7 SUS at 130° F., and 43.8 SUS at 210° F. This product is an excellent synthetic lubricant and can be substituted for petroleum lubricating oils in applications where a wide liquidus range and a high viscosity index are required. This product is also useful as a brake fluid or hydraulic fluid.

*Example III*

In still another experimnet, 2-ethylhexyl phosphoryl dichloride was added to an ether solution of triethylene glycol in a mol ratio of 1.0. The reaction was carried out using the same apparatus and the same conditions as the preceding experiments. After the product had been freed of by-products and analyzed, it was found to have a phosphorus content of about 9.8 wt. percent and an average molecular weight, based on several measurements, of about 3500. This product had a pour point of −35° F. and a V.I. of 126. This product was a very viscous liquid and had a viscosity of 3146 SUS at 100° F., 1391 SUS at 130° F., and 316.1 SUS at 210° F. Due to the high initial viscosity and high viscosity index of this product, it is especially suited for use as a high-temperature lubricant.

From these three examples and other experiments, we have determined that it is possible to produce phosphate esters of varying molecular weight by varying the mol ratio of the reactants. When a very low ratio (e.g., 0.25)

of the alkyl phosphoryl dihalide to glycol is used, the product is predominantly a monomeric phosphate ester of the glycol. As the mol ratio of the phosphoryl dihalide to glycol is increased, the molecular weight of the product increases rapidly and the product represents mixtures containing increasing amounts of higher polymers. Thus, by varying the mol ratio of the reactants we can obtain fluids of almost any desired viscosity, all of which have high V.I.'s and low pour points. These products combine the good lubricating properties, low volatility, and low flammability of the phosphate esters with the high V.I. required in a good high-temperature lubricant. These products are also useful as brake fluids or hydraulic fluids.

*Example IV*

In another experiment, 2-ethylhexyl phosphoryl dichloride was added to a solution of ethylene glycol in anhydrous ether in a mol ratio of 0.5. The apparatus used and conditions of reaction were the same as described in Examples I to III. The product which was recovered had a molecular weight of 1115. This product had a pour point of —45° F., a V.I. of 116, and a viscosity of 1429 SUS at 100° F., 608.1 SUS at 130° F., and 130.1 SUS at 210° F.

*Example V*

In still another experiment 2-ethylhexyl phosphoryl dichloride was reacted with a solution of a mixture of polypropylene glycols having an average molecular weight of 1025 (having a range of molecular weight from about 100 to 4000) in anhydrous ether. The conditions of reaction and apparatus were the same as used in the other experiments. The product obtained was a moderately viscous liquid having a molecular weight of 1682. This liquid had a pour point of —40° F., a V.I. of 135, and a viscosity of 581.4 SUS at 100, 287.4 SUS at 130° F., and 88.7 SUS at 210° F.

*Example VI*

In another experiment, the procedure of Example I was repeated substituting m-cresol for the 2-ethylhexanol used in the first step. In this first step of the process m-cresol and phosphorus oxychloride were reacted in equimolar proportions to produce m-tolyl phosphroyl dichloride. The m-tolyl phosphoryl dichloride was then added, in a 0.5 mol ratio, to a solution of triethylene glycol in anhydrous ethyl ether. The apparatus used and conditions of the reaction were the same as in Example I. The product of this reaction was a moderately viscous liquid having a molecular weight of 795. This liquid had a pour point of 0° F., a V.I. of 87, and a viscosity of 1495 SUS at 100° F., 546.3 SUS at 130° F., and 104.7 SUS at 210° F.

*Example VII*

In still another experiment, the procedure of Examples I to III was followed substituting resorcinol for the glycol used in the other experiments. In this experiment 2-ethylhexyl phosphoryl dichloride was added in a 0.5 mol ratio to a solution of resorcinol in anhydrous ethyl ether. The product which was recovered was a highly viscous liquid having a molecular weight of 1520. This liquid had a pour point of 35° F. and a V.I. of 107. The viscosity of the liquid was measured and was found to be 7594 SUS at 100° F., 2626 SUS at 130° F., and 352.7 SUS at 210° F.

*Example VIII*

When Example IV is repeated, substituting phosphorus oxybromide for phosphorus oxychloride in the first step of the reaction, the product obtained is 2-ethylhexyl phosphoryl dibromide. When 2-ethylhexyl phosphoryl dibromide is added to a solution of ethylene glycol in dimethoxyethane and reacted as in the preceding examples, the product obtained is a liquid phosphate ester having a molecular weight of about 1100, a pour point of about —45° F., and a V.I. in excess of 110.

*Example IX*

When the procedure of Example I is repeated, substituting Cellosolve (2-ethoxyethanol-1) for 2-ethylhexanol in the first step, the initial product obtained is 2-ethoxyethyl phosphoryl dichloride. When this product is added to an ether solution of diethylene glycol and reacted under the conditions of Example I a moderately viscous liquid is obtained having a molecular weight of about 1400, a V.I. of about 120 and a pour point of less than —20° F.

*Example X*

When amyl alcohol is substituted for 2-ethylhexanol in the first step of the procedure used in Example I, the product obtained is amyl phosphoryl dichloride. When this product is added to a solution of salicyl alcohol in dimethyl ether, a viscous liquid product is obtained having a V.I. of about 110 and a molecular weight of about 1600.

As noted in Examples I, II, III, V, VI, VII, and IX, the compounds of this invention include polyphosphate esters having 2 to 10 units per molecule.

The various dihydroxy compounds used in this process vary considerably in their reactivity toward the alkyl or aryl, or substituted-alkyl, or -aryl, phosphoryl dihalides and thus the conditions required for any particular reaction may vary somewhat. In general, the temperature of the reaction may be in the range from —20 to +20° F., although the temperature of 10° to 15° C. is preferred. The various examples have all been described using pyridine for removing the by-product HCl. It is well known in the art of esterification of phosphorus halides that lower aliphatic alcohols are more reactive than higher molecular weight alcohols and phenols. Thus, the reaction with low-molecular-weight glycols can be carried out using nitrogen stripping, or the equivalent, to remove the by-product HCl. Most reactions, however, require the use of a suitable base, preferably a tertiary nitrogen base, as an acceptor for the by-product HCl. Thus, while pyridine has been disclosed, other bases may be used, such as triethylamine, dimethyl aniline, or ion-exchange resins, which will accept the by-product HCl. As has previously been indicated, a wide variety of compounds may be used as reactants in this process. In general, any alkyl or aryl phosphoryl dihalide of the type previously defined, and any dihydroxy organic compound as previously defined may be used in solution in a suitable mutual solvent for the reactants which is inert toward the reactants under the conditions of reaction. The viscosity and molecular weight of the reaction products can be varied by varying the proportion of the reactants. A low proportion, e.g., 0.125, of alkyl or aryl phosphoryl dihalide to the dihydroxy organic compound produces a reaction product which is essentially a monomeric ester. As the ratio of alkyl or aryl phosphoryl dihalide to the dihydroxy organic compound is increased, the molecular weight of the products and the viscosity of the products increases due to the formation of greater proportions of relatively high-molecular-weight ester polymers. In substantially all cases, however, the products, although very viscous, have high viscosity indexes and low pour points which make them especially useful as synthetic lubricants, brake fluids, or hydraulic fluids. Where reactants of very high molecular weight are used, the reaction takes place as with the lower-molecular-weight reactants, except that solid products are obtained. The solid polyphosphate esters thus produced are useful as coatings and as fillers for paint compositions.

The embodiments of the invention in which an exclusive property or privilege is claimed are defined as follows:

1. A polyphosphate of the formula

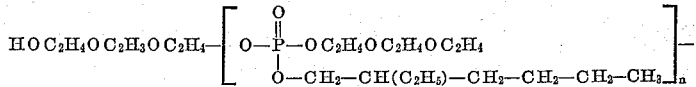

wherein $n$ is an integer of 2 to 10.

2. Liquid polyphosphates prepared by adding 2-ethylhexyl phosphoryl dichloride in a mole ratio of about 0.5 to a solution of ethylene glycol in anhydrous ethyl ether in the presence of pyridine at a temperature of about 15° C., said esters being characterized by having a molecular weight of about 1115.

3. Liquid polyphosphates prepared by adding 2-ethylhexyl phosphoryl dichloride to a solution of a mixture of polypropylene glycols having an average molecular weight of about 1025 in anhydrous ethyl ether in the presence of pyridine at a temperature of about 15° C., said esters being characterized by having a molecular weight of about 1682.

4. Liquid polyphosphates prepared by adding m-tolyl phosphoryl dichloride in a mole ratio of about 0.5 to a solution of triethylene glycol in anhydrous ethyl ether in the presence of pyridine at a temperature of about 15° C., said esters being characterized by having a molecular weight of about 795.

5. Liquid polyphosphates prepared by adding 2-ethylhexyl phosphoryl dichloride in a mole ratio of about 0.5 to a solution of resorcinol in anhydrous ethyl ether in the presence of pyridine at a temperature of about 15° C., said esters being characterized by having a molecular weight of about 1520.

References Cited by the Examiner

UNITED STATES PATENTS

| | | |
|---|---|---|
| 2,586,897 | 2/1952 | Woodstock _____ 260—461 X |
| 2,636,876 | 4/1953 | Zenftman _____ 260—461 X |
| 2,728,790 | 12/1955 | Sroog _____ 260—461 |
| 2,842,462 | 7/1958 | Haas et al. _____ 260—461 XR |
| 2,879,287 | 3/1959 | Lanham _____ 260—461 |
| 2,909,559 | 10/1959 | Lanham _____ 260—461 |
| 2,952,666 | 9/1960 | Coover et al. _____ 260—461 |
| 2,990,421 | 6/1961 | Melton _____ 260—461 |
| 3,005,007 | 10/1961 | Fierce et al. _____ 260—461 |
| 3,013,991 | 12/1961 | Fierce et al. _____ 260—461 |

OTHER REFERENCES

Kosolapoff, "Organo-Phosphorus Compounds," John Wiley & Sons, New York (1950), pages 224–227.

Zenftman, "Abstracts of Papers," 134th Meeting, American Chemical Society (Sept. 1958), pp. 17Q–18Q.

CHARLES B. PARKER, *Primary Examiner*.

ABRAHAM H. WINKELSTEIN, MORRIS LIEBMAN,
*Examiners*.